United States Patent [19] [11] 4,305,002

Mortensen [45] Dec. 8, 1981

[54] TWO STAGE STARTER DRIVE SYSTEM

[75] Inventor: Harold R. Mortensen, Horseheads, N.Y.

[73] Assignee: Facet Enterprises, Inc., Tulsa, Okla.

[21] Appl. No.: 962,353

[22] Filed: Nov. 20, 1978

[51] Int. Cl.[3] ........................ F02N 11/00; H02P 9/04; F02N 17/00; F02N 11/08

[52] U.S. Cl. ........................ 290/38 R; 290/48; 290/DIG. 1; 74/7 R; 123/179 R

[58] Field of Search ................. 290/38 R, 48, DIG. 1; 74/7 A, 7 R; 123/179 R, 179 B, 38 A, 36 R

[56] References Cited

U.S. PATENT DOCUMENTS 2,727,158 12/1955 Seilly .................. 290/38
3,597,622 4/1970 Wilson .................. 290/38 R
3,866,960 2/1975 Chohan .................. 290/38 R

*Primary Examiner*—J. V. Truhe
*Assistant Examiner*—John B. Conklin
*Attorney, Agent, or Firm*—Remy J. VanOphem

[57] ABSTRACT

A two stage positive shift starter drive system for an internal combustion engine is disclosed. A pair of electrical switches are sequentially actuated by an actuator solenoid engaging the starter drive's pinion gear with the engine's ring gear. The first switch actuated after a predetermined displacement of the solenoid's armature applies electrical power to the cranking motor through a resistance connected in series with the cranking motor and connected in parallel with the solenoid's pull in coil. The resistance reduces the electrical power applied to the cranking motor and the potential across the solenoid pull-in coil thereby reducing the rotational speed and the engagement force applied to the pinion gear. The end of the armature travel closes the second switch applying full power to the cranking motor permitting normal cranking of the engine with the pinion gear fully engaged with the ring gear.

9 Claims, 3 Drawing Figures

TWO STAGE STARTER DRIVE SYSTEM

BACKGROUND OF THE INVENTION

I. Field of the Invention

This invention relates to starter drives for an internal combustion engine and, specifically, to a control circuit which applies electrical power to the starter drive in two stages; the first stage being a reduced power level permitting slow engagement of the driving gear of the starter and the driven gear of the engine and the second stage applying full power to the cranking motor cranking the engine at normal speed.

II. Description of the Prior Art

Two stage starter drive systems employing a resistor in a circuit in order to decrease the power of the electric starting motor in a first stage are known in the art.

West in U.S. Pat. No. 3,584,229 discloses a solenoid having an E shaped core with two windings thereon in order to include a resistor in the series to affect starting of an engine.

A number of systems and improvements thereon have been developed for use with quick-pitch screw-thread type starters. Seilly in U.S. Pat. Nos. 3,124,694; 3,210,554 and 3,399,576 disclose the improvements in systems which include a resistance for such a starter. All of these circuits are used in conjunction with a plurality of catch balls which secure a sleeve to the motor shaft when the driving gear is engaged with the driven gear of the engine. These balls prevent inadvertent return of the sleeve to its rest position before the engine is fully started. Similarly, Gubb and Seilly in U.S. Pat. No. 3,358,667 discloses an improved circuit for including a resistance in quick-pitch screw-thread starting mechanism. Seilly, U.S. Pat. No. 3,469,106 discloses a similar circuit with a resistance from the motor control circuit. In U.S. Pat. No. 2,727,158, Seilly discloses a further improvement for a quick-pitch screw-threaded starter drive mechanism. The improvement therein lies in the use of a catch as shown in FIGS. 1A and 2A of that patent. The novel catch is used to regulate the inclusion or exclusion of a resistance in the control circuit.

Circuits including a resistance to control the motor speed for starting are also known for positive shift starter drive systems. These include Broyden, U.S. Pat. No. 3,433,968, wherein there is disclosed a single set of contacts on the plunger of the solenoid which set of contacts act simultaneously with the positive shift arm to the pinion gear. Closing the circuit between these contacts effectively short circuits a parallel resistance circuit, which resistance circuit insures slow engagement of the driving and driven gears. Similarly, Chohan in U.S. Pat. No. 3,866,960 discloses a contact/armature structure and associated circuitry for controlling the power to the cranking motor by means of a parallel resistance circuit which employs a conventional electric relay.

SUMMARY OF THE INVENTION

The present invention is provided specifically for use with positive shift type starter drive system wherein the electric cranking motor has an extended shaft with a pinion gear slidably mounted thereon and rotated by the motor shaft. A shift mechanism is connected to the armature of a solenoid actuator and operates to axially slide the pinion gear in one direction to engage and in an opposite direction to disengage the pinion gear and the cranking gear of the engine to be started. The solenoid actuator has pull-in and hold-in coils which affect the armature for movement thereof, thereby engaging and disengaging the driving or pinion gear with the engine's cranking gear.

Electrical power is supplied to the cranking motor through a pair of normally open electrical switches attached to the solenoid and sequentially actuated by the displacement of the solenoids armature. Energization of the solenoid's coils initiates movement of the armature. After a predetermined displacement of the armature, the first switch is closed supplying electrical power to the motor through a resistance connected in series with the motor and in parallel with the solenoid's pull-in coil. The series resistance simultaneously reduces the electrical power to the motor, reducing the motor shaft speed and reduces the armature travel speed, thereby insuring the engagement of the pinion and driven gears into a meshed condition at reduced speeds. When the gears are completely meshed, the armature has traveled a further distance within the solenoid and closes the second switch. Closing of the second switch short circuits both the pull-in coil and the resistance and applies full power to the motor simultaneously deactivating the pull-in coil. The hold-in coil having a separate ground remains energized. The application of full power to the motor increases the rotational speed of the motor shaft to a speed sufficient to start the engine.

The disclosed starter drive system affects engagement of the pinion gear with the engine's driven gear at reduced power levels until the drive is fully engaged.

It is, therefor, an object of the present invention to provide a reliable two stage positive shift starter drive system with minor modification to existing components.

It is a further object of the present invention to provide a two stage starter drive system which eliminates the abutment clearing mechanisms required on prior art systems.

It is still a further object of the present invention to make the starter drive system smaller by eliminating tooth abutment clearing mechanisms thereby permitting the use of smaller pinion gears than heretofore possible.

These and other objects of the present invention will become apparent by a better understanding of the invention gained by reference to the accompanying drawings wherein:

DESCRIPTION OF THE PREFERRED EMBODIMENT

Figure 1:
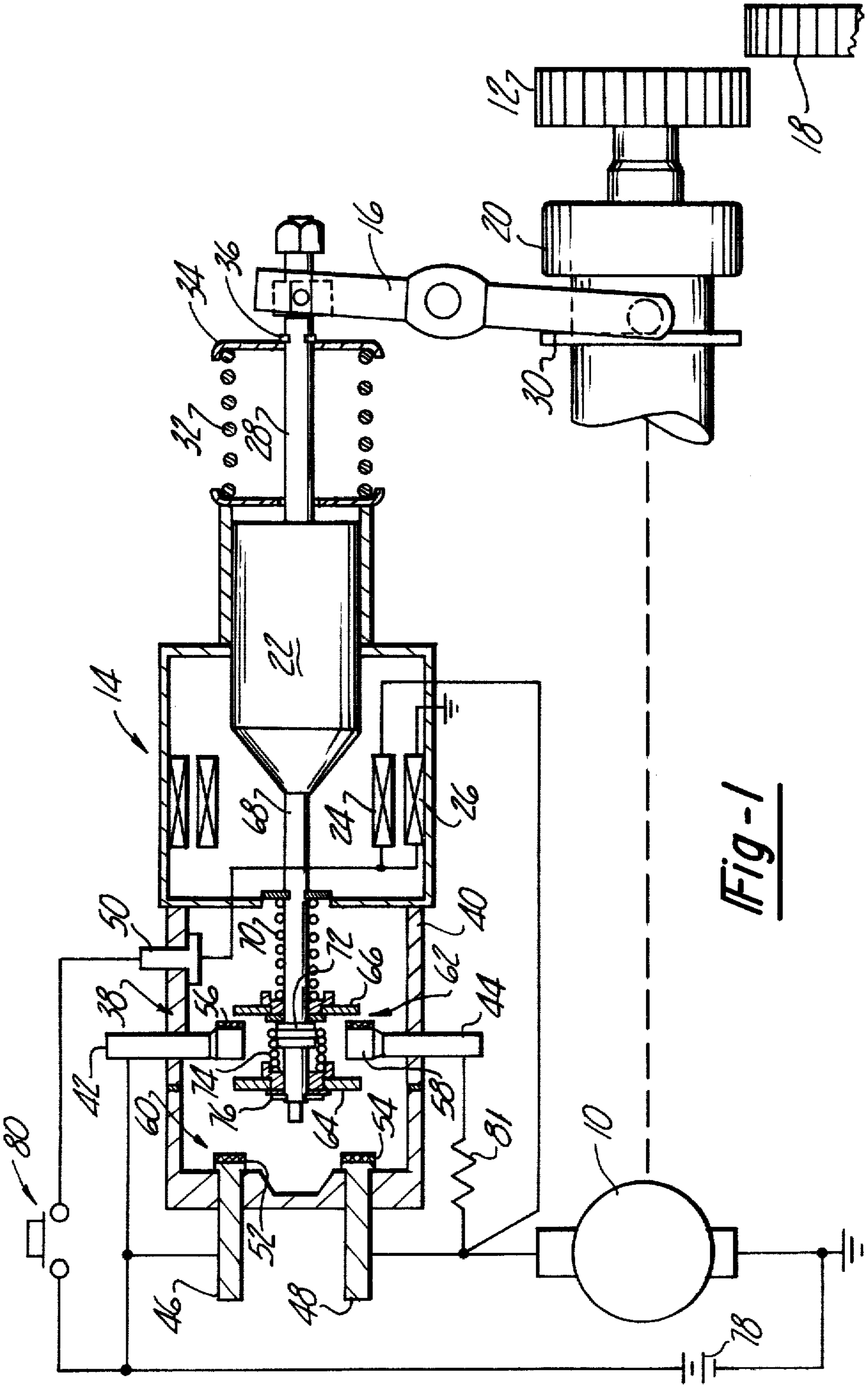
FIG. 1 shows the disclosed starter drive system in schematic form in its deenergized state with both switches in their normally open state.

Referring to FIG. 1, a positive shift electrical starter drive system is shown in schematic form. The starter drive system comprises a cranking or starter motor 10 having a splined output shaft connected to a pinion gear 12, a solenoid actuator 14, and a shifting mechanism 16 operative to axially displace the pinion gear 12 along the splined shaft of the motor from a disengaged position to a position in which the pinion gear is fully engaged with an engine cranking gear 18 connected to the crankshaft of an engine, not shown. In a conventional starter system, the gear 18 is a ring gear connected to the engine's flywheel, but may be any other gear which is capable of transferring the rotation of the pinion gear 12 to the engine's crankshaft when engaged.

The arrangement of the cranking motor 10, pinion gear 12, shifting mechanism 16, and the gear 18 are of conventional design and their interrelationship need not be discussed in detail for an understanding of the invention. Briefly, when the solenoid actuator is energized, the shifting mechanism 16 displaces the disengaged pinion gear 12 into engagement with the ring gear 18 and the motor 10 drives the cranking gear 18 through the engaged pinion gear 12 until the engine starts. Conventionally, an override clutch such as clutch 20 is provided between the pinion gear 12 and the motorshaft permitting the pinion gear to rotate freely after the engine is started at which time the rotational speed of the pinion gear 12 is greater than the rotational speed of the starter motor's output shaft.

The solenoid actuator 14 comprises an armature 22 axially disposed within an annular shaped pull-in coil 24 and a concentric hold-in coil 26. The armature has an actuator shaft 28 extending rearwardly, i.e., to the right on the illustration of FIG. 1, and is pivotally connected to one end of the shifting mechanism 16. The other end of the shifting mechanism 16 is pivotally connected to a collar or yoke 20 attached to or formed in the pinion gear drive shaft as is known in the art. The shifting mechanism 16 is pivotally mounted at a point intermediate its two ends such that an axial movement of armature 22 will by means of actuator shaft 28 rotate the shifting mechanism 16 about its intermediate pivot point and axially move the pinion gear yoke 30 and the pinion gear 12 in a direction opposite to the movement of the armature. The armature is biased away from the pull-in and hold-in coils 24 and 26 respectively by means of a resilient member, such as a coil spring 32 acting against a spring retainer 34 positionally restrained along actuator shaft 28 by a stop such as a "C" ring 36 disposed in a groove formed in shaft 28.

Figure 3:
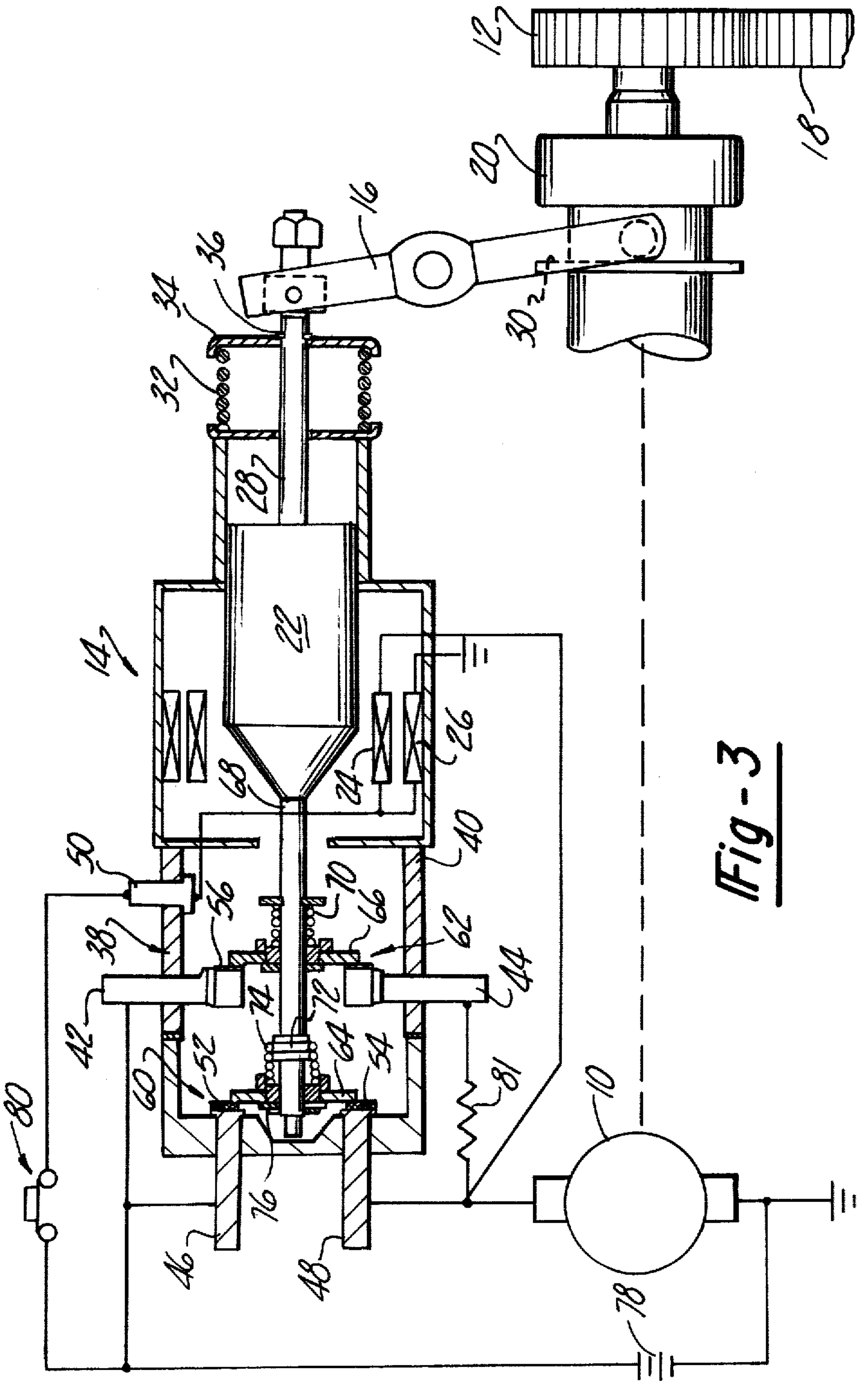
FIG. 3 shows the disclosed starter drive system in the energized state with both switches closed and full engagement of the pinion gear with the driven gear.

The relationship between the solenoid actuator's armature 22 and its actuator shaft 28, the resilient biasing means comprising coil spring 32, retainer 34, shifting mechanism 16 and pinion gear 12 are of a conventional arrangement and need not be discussed in detail. Briefly, with the pull-in and hold-in coils deenergized, the armature 22 and the attached actuator shaft 28 are displaced to the right by the biasing force of spring 32. The shifting mechanism 16 is rotated about the intermediate pivot point to its clockwise most position displacing the pinion gear 12 to the left where it is disengaged from the cranking gear 18. Energizing the pull-in coil 24 displaces the armature 22 to the left against the force of spring 32 and the actuator shaft 28 causes the shifting mechanism 16 to rotate counter-clockwise about its intermediate pivot point. The counter-clockwise rotation of the shifting mechanism 16 displaces the pinion gear 12 to the right and into engagement with the cranking gear 18 as shown in FIG. 3.

At the opposite end of the solenoid actuator 14, i.e., left end as illustrated in FIG. 1, is a dual stage switch mechanism 38 comprising a housing 40, a first set of electrodes 42 and 44, a second set of electrodes 46 and 48 and an electrical feed-through 50. The electrodes 42 through 48 pass through the housing 38 as shown and the external portions form contact terminals for external electrical connection to the electrodes. The inner portions of electrodes are contact poles 52 through 58 for a pair of normally open switches 60 and 62 respectfully. The normally open switch 60 comprises the contact poles 52 and 54 and a first contact disc 64 resiliently mounted at or near the end of and electrically insulated from a switch shaft 68 attached to the armature 22. The normally open switch 62 comprises contact poles 56 and 58 and a second contact disc 66 disposed at an intermediate point along and electrically insulated from the switch shaft 68. The contact discs 64 and 66 are positioned along the switch shaft 68 such that the contact disc 66 physically contacts the poles 56 and 58 closing switch 62 at an intermediate position of the armature 22 between its unenergized biased position (extreme right in FIG. 1) and its fully actuated position (extreme left). The contact disc 64 physically contacts the contact poles 52 and 54 the closing switch 60 just prior to the armature 22 reaching its fully actuated position (extreme left of its travel). The Spring 70 resiliently biases the contact disc 66 against a stop 72 and permits the switch shaft 68 to continue to move to the left after the contact disc 66 contacts the poles 56 and 58. In a like manner, the spring 74 biases the contact disc 64 against a stop 76 such as a "C" ring disposed in a groove at the end of the switch shaft 68.

As previously discussed, contact disc 64 contacts poles 52 and 54 just prior to the armature reaching its fully actuated position. The Spring 74, therefor, permits the armature 22 to go to its fully actuated position while the spring 74 holes the contact disc 64 against the poles 52 and 54.

The resilient mounting of the contact disc 64 to the switch shaft 68 permits good electrical contact to be established and maintained between the contact poles 52 and 54 even if the contacts erode by arcing or by other electrochemical effects known in the art. The contact faces of the poles may be overlayed, as indicated by the cross hatched portion, with a noble metal or special alloy to reduce arcing and contact erosion.

Electrical power is received by the starter drive system from a source of electrical power such as battery 78. The battery 78 has one terminal connected to a common ground signified by a conventional ground symbol. The other terminal of the battery 78 is connected to the electrodes 42 and 46 which function as input terminals to switches 60 and 62 respectively and to one terminal of a starter switch 80. The starter switch 80 may be an independant switch as illustrated or a multiple position multiple contact switch as commonly found on modern day automotive vehicles. The other terminal of the starter switch 80 is connected to the input lead connections of the pull-in and hold-in coils 24 and 26 through the feedthrough 50. The output lead of hold-in coil 26 is connected to the common ground of the battery 78 and the output lead of pull-in coil 24 is connected to the electrode 48. The Electrode 48 functions as the output terminal of the switch 60 and is connected directly to the input terminal of the starter motor 10. The output terminal of the starter motor 10 is connected to the common ground of the battery 78. The electrode 44 functions as the output terminal of the switch 62 and is connected to the input terminal of the starter motor 10 through a resistance 81. The resistance 81 may be a piece of nichrome or resistance wire having a predetermined resistance. The impedance of the resistance 81 is selected to provide a voltage drop thereacross, when connected in series with the motor 10, sufficient to energize the pull-in coil 24 to produce an attractive force on the armature 22 greater than the opposing force of the spring 32. In a practical automotive starter application, a resistance of about 0.19 ohms for resistance 81 produces the desired voltage drop.

Figure 2:
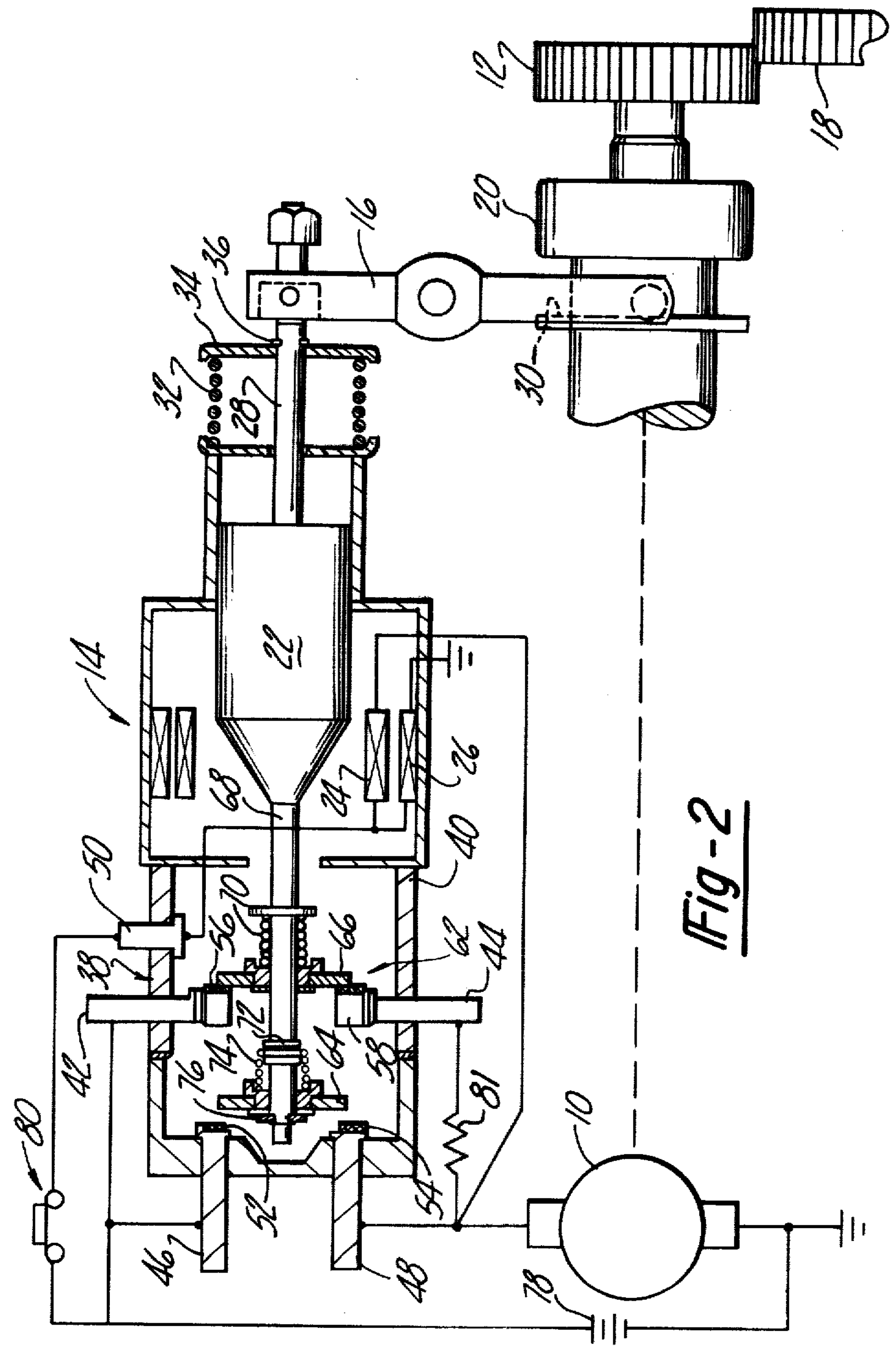
FIG. 2 shows the disclosed starter drive system in the energized state with only the first switch closed and initial engagement of the pinion gear with the driven gear.

The operation of the starter drive system is discussed with respect to FIGS. 1, 2 and 3. FIG. 2 is identical to FIG. 1 and shows the relative position of the component parts and the states of the switches 60 and 62 when the armature 22 is displaced to an intermediate position sufficient to close switch 62. FIG. 3 shows the relative positions of the component parts and the states of the switches 60 and 62 when the armature 22 is in its fully actuated position.

Referring first to FIG. 1, the starter drive system is shown in its quiescent or unactuated state. The starter switch 80 is open placing the pull-in and hold-in coils 24 and 26 respectively in an unenergized state. The armature 22 is biased to the right by the spring 32 and the switches 60 and 62 are in their normally open positions. The shifting mechanism 16 is rotated by the actuator shaft 28 to its extreme clockwise position displacing the pinion gear 12 to the left, out of engagement with the cranking gear 18.

Now referring to FIG. 2, the starter switch 80 is closed energizing the pull-in and hold-in coils 24 and 26. The armature 22 has responded to the magnetic fields generated by the coils 24 and 26 and has moved to an intermediate position against the biasing force of the spring 32. The actuator shaft 28 moves with the armature 22 and rotates the shifting mechanism 16 in a counter-clockwise direction. The counter-clockwise rotation of the shifting mechanism 16 displaces the pinion gear 12 towards the cranking gear 18. Prior to the engagement of the pinion gear 12 with the cranking gear 18, the contact disc 66 has contacted poles 56 and 58 closing switch 62. The closing of the switch 62 applies electrical power to the cranking motor 10 through the resistance 81. This places an additional impedance in the motor circuit; which substantially reduces the electrical power applied to the cranking motor 10 causing its output shaft to rotate at a reduced speed and at a reduced power level. The closing of the switch 62 also reduces the potential applied across the pull-in coil 24 to the potential drop across the resistance 81 which reduces the magnetic force pulling the armature 22 to the left against the force of the spring 32. This reduced force also reduces the velocity at which the pinion gear 12 is moved towards the cranking gear 18. As the armature 22 continues to move to the left at the reduced velocity and with the starter motor operating at a reduced speed and power level, the pinion gear 12 is engaged with the cranking gear 18 by the continued counter clockwise rotation of the shifting mechanism 16. This permits positive engagement to take place as the two gears are brought together without forceful indexing of the pinion gear 12 with the cranking gear 18. When abutment occurs, the reduced rotational speed of the pinion gear 12 permits engagement to occur when the next engagement alignment between the pinion gear 12 and cranking gear 18 occurs.

After engagement, the armature 22 moves to the extreme left end of its travel, and the contact disc 64 contacts the poles 52 and 54, closing switch 60 as shown in FIG. 3 applying full battery power to the cranking motor 10. In this position of the armature 22, the switch 62 remains closed. However, the resistance 81 is now in a parallel circuit relationship with the closed switch 60 and is effectively short circuited. The closing of the switch 60 raises the potential at the output lead of the pull-in coil 24 to the battery potential thereby deactivating the pull-in coil 24. The hold-in coil 26 having its output lead connected to the common ground remains energized and holds the armature 22 in the fully actuated position (extreme left) as long as the starter switch 80 remains closed. The system remains in this state until the switch 80 is opened.

When the switch 80 is opened, the hold-in coil 26 is de-energized and the armature returns to its quiescent or deenergized position (extreme right as shown in FIG. 1) position by the action of spring 32. Simultaneously, the shifting mechanism is rotated clockwise disengaging the pinion gear 12 from the cranking gear 38. The movement of the armature 22 to the right also withdraws contact discs 64 and 66 from the associated poles opening the switches 60 and 62. The opening of the switches 60 and 62 terminates the electrical power being supplied to the cranking motor 10 from the battery 78 thus completing the cycle.

What is claimed is:

1. A dual mode electrical starter drive system for cranking an engine having a cranking gear, a source of electrical power and a starter switch connected thereto, the starter drive system comprising:

a cranking motor having an output shaft rotatable in response to receiving electrical power from the source of electrical power;

a pinion gear attached to said output shaft and rotatable therewith, said pinion gear axially translatable along said output shaft;

solenoid actuator means having a resiliently biased armature movable therein from a first to a second position, a pull-in coil and a hold-in coil receiving electrical power from said source of electrical power through said starter switch, said armature movable from said first position against the force of said resilient bias to said second position in response to said pull-in coil receiving electrical power and operative to remain in said second position as long as said hold-in coil receives electrical power; said pull-in and hold-in coils each having an input lead connected to the starter switch and an output lead, the output lead of said hold-in coil connected to a common electrical ground;

shifting means mechanically linking said armature with said pinion gear for axially displacing said pinion gear into engagement with the engine's cranking gear when said armature is in said second position and for axially displacing said pinion gear to disengage from the engine's cranking gear when said armature is in said first position; and switch means attached to said solenoid actuator means for controlling the electrical power received by the cranking motor and the pull-in coil as a function of the position of the solenoid actuator means armature, said switch means applying full electrical power to the pull-in coil and no power to the cranking motor with the armature in said first position, for applying reduced electrical power to said pull in coil and said cranking motor after said armature has moved to a predetermined intermediate position between said first position and said second position, and for applying full electrical power to the cranking motor and no electrical power to the pull-in coil when said armature is in said second position.

2. The starter drive system of claim 1 wherein said switch means comprises:

a first switch responsive to the position of said armature having an input terminal connected to said source of electrical power and an output terminal, said switch normally open with said armature in first position and operative to be closed with said armature in said intermediate and said second position;

a resistance having a predetermined value disposed between the output terminal of said first switch and said cranking motor; and a second switch responsive to the position of said armature having an input terminal connected to said source of electrical power and an output terminal connected to said cranking motor and to the output lead of said pull in coil, said second switch normally opens with said armature in said first and said intermediate positions and operative to be closed with said armature in said second position.

3. The starter drive system of claim 2 wherein said first and second switch further comprises:

a housing having a closed end and an open end attached to said solenoid actuator means;

a first and a second electrode electrically isolated from each other disposed proximate said closed end and extending through said housing, each electrode having an internal portion and an external portion, the external portions of said first and second electrode respectively being the input and output terminals of said second switch;

a third and a fourth electrode disposed through said housing at an intermediate location between said closed end and said open end, each electrode having an external portion and an internal portion, the external portions of said third and fourth electrodes being respectively the input and output terminals of said first switch;

a switch shaft having one end extending into said housing and the other end connected to the armature of the solenoid actuator means and movable therewith;

a first electrical contact member resiliently attached to said one end of the switch shaft and electrically insulated therefrom, said first electrical contact member operative to contact the internal portions of said first and second electrodes with the armature in said second position; and a second electrical contact member resiliently attached to said switch shaft at an intermediate position between said one end and said other end and electrically insulated therefrom, said second electrical contact member operative to contact the internal portions of said third and fourth electrodes when said armature is at said predetermined intermediate position.

4. The starter drive of claim 2 wherein the predetermined value of said resistance is selected to have a potential drop thereacross when the first switch is closed equal to a potential value sufficient for said pull-in coil to continue to move said armature to said second position at a rate and with a force substantially less than that which the armature would have in response to the full potential of said source of electrical power.

5. A device for supplying dual electrical power levels to the cranking motor and solenoid actuator of a positive shift starter drive system for cranking the crankshaft of an engine, said device comprising:

a source of electrical power;

a starter switch connected to said source of electrical power;

a cranking motor having an output shaft rotatable in response to receiving electrical power from said source of electrical power;

a pinion gear attached to said output and rotatable therewith, said pinion gear axially translatable along said output shaft;

a cranking gear attached to the engine's crank shaft;

solenoid actuator means having a resiliently biased armature movable therein from a first to a second position, a pull-in coil and a hold-in coil receiving electrical power from said source of electrical power through said starter switch, said armature movable from said first position against the force of said resilient bias to said second position in response to said pull-in coil receiving electrical power and operative to remain in said second position as long as said hold-in coil receives electrical power, said pull-in and hold-in coils each having an input lead connected to the starter switch and an output lead, said output lead of said hold-in coil connected to a common electrical ground;

shifting means mechanically linking said armature with said pinion gear for axially displacing said pinion gear into engagement with the engine's cranking gear when said armature is in said second position and for axially displacing said pinion gear to disengage from the engine's cranking gear when said armature is in said first position; and switch means attached to said solenoid actuator means for controlling the electrical power received by the cranking motor and the pull-in coil as a function of the position of the solenoid actuator means armature, said switch means applying full electrical power to the pull-in coil and no power to the cranking motor with the armature in said first position for applying reduced electrical power to said pull-in coil and to said cranking motor after said armature has moved to a predetermined intermediate position between said first position and said second position, and for applying full electrical power to the cranking motor and no electrical power to the pull-in coil when said armature is in said second position.

6. The device as claimed in claim 5 wherein said switch means further comprises:

a first switch responsive to the position of said armature having an input terminal connected to said source of electrical power and an output terminal, said switch normally open with said armature in first position and operative to be close with said armature in said intermediate and said second position;

a second switch responsive to the position of said armature having an input terminal connected to said source of electrical power and an output terminal connected to said cranking motor and to the output lead of said pull-in coil, said second switch normally opens with said armature in said first and said intermediate positions and operative to be closed with said armature in said second position; and a resistance having a predetermined value disposed between the output terminal of said first switch and said cranking motor.

7. The device as claimed in claim 6 wherein said first and second switch further comprises:

a housing having a closed end and an open end attached to said solenoid actuator means;

a first and second electrode electrically isolated from each other disposed proximate said closed end and extending through said housing each electrode having an internal portion and an external portion, the external portions of said first and second electrodes respectively being the input and output terminals of said second switch;

a third and a fourth electrode disposed through said housing at an intermediate location between said open end and said closed end, each having an external portion and an internal portion, the external portions of said third and fourth electrodes being respectively the input and output terminals of said first switch;

a switch shaft having one end extending into said housing and the other end connected to the armature of the solenoid actuator means and movable therewith;

a first electrical contact member resiliently attached to said one end of the switch shaft and electrically insulated therefrom, said first electrical contact member operative to contact the internal portions of said first and second electrodes with the armature in said second position; and a second electrical contact member resiliently attached to said switch shaft at an intermediate location between said one end and said other end and electrically insulated therefrom, said second electrical contact member operative to contact the internal portions of said third and fourth electrodes when said armature is at said predetermined intermediate position.

8. The device as claimed in claim 6 wherein the predetermined value of said resistance is selected to have a potential drop thereacross, when the first switch is closed, equal to a potential value sufficient for said pull-in coil to continue to move said armature to said second position at a rate and with a force substantially less than that which the armature would have in response to the full potential of said source of electrical power.

9. In combination with an external source of electrical power; a second electrically activated device; and a solenoid actuator of the type having a pull-in coil; a hold-in coil; a resiliently biased armature, said armature being movable from a first position to a second position in response to said external source of electrical power energizing said pull-in and hold-in coils; and a dual mode power switch, the improvement comprising:

two normally open electrical switches sequentially closed by movement of the armature of said solenoid actuator from said first position to said second position, the first of said two switches having an input terminal for receiving electrical power from the external electrical power source, and an output terminal, said first switch closing in response to the resiliently biased armature of said solenoid actuator being displaced to a predetermined intermediate position between said first and second position and the second of said two switches having an input terminal for receiving electrical power from the external source and an output terminal connected to the output of said hold-in coil and to the input of said second electrically activated device, said second switch closing in response to the armature being in its second position; and a resistance having a predetermined value connected between the output terminal of said first switch and the input of said second electrically activated device.

* * * * *